United States Patent
Petridis et al.

(10) Patent No.: US 9,878,713 B2
(45) Date of Patent: Jan. 30, 2018

(54) METHOD AND APPARATUS FOR CONTROLLING AN ENGINE OF A MOTOR VEHICLE (75) Inventors: Themi Philemon Petridis, Bishop's Stortford (GB); Peter George Brittle, Romford (GB); Ian Halleron, Chelmsford (GB)

(73) Assignee: Ford Global Technologies, LLC, Dearborn, MI (US)

(*) Notice: Subject to any disclaimer, the term of this patent is extended or adjusted under 35 U.S.C. 154(b) by 911 days.

(21) Appl. No.: 13/427,707

(22) Filed: Mar. 22, 2012

(65) Prior Publication Data

US 2012/0265427 A1   Oct. 18, 2012

(30) Foreign Application Priority Data

Apr. 14, 2011  (GB) .................... 1106336.9

(51) Int. Cl.
*B60W 30/18* (2012.01)
*B60W 10/02* (2006.01)
(Continued)

(52) U.S. Cl.
CPC ...... *B60W 30/18018* (2013.01); *B60W 10/02* (2013.01); *B60W 10/06* (2013.01);
(Continued)

(58) Field of Classification Search
CPC ............. B60W 10/06; B60W 10/02; B60W 2510/0638; B60W 2710/0644; B60W 30/18027; B60W 20/00; Y10T 477/79; Y10T 477/70; Y10T 477/6403; Y10T 477/78; Y10T 477/753; Y10T 477/75; Y10T 477/6414
(Continued)

(56) References Cited

U.S. PATENT DOCUMENTS 5,664,458 A * 9/1997 Stasik ............... B60W 10/111
477/80
6,524,217 B1 * 2/2003 Murakami ............ B60K 6/365
180/65.225
(Continued)

FOREIGN PATENT DOCUMENTS

GB   2047816 A   12/1980
GB   2469183 A   10/2010
(Continued)

OTHER PUBLICATIONS

Anonymous, "Stationary Vehicle Mass Estimation," IPCOM No. 000230758, Published Sep. 10, 2013, 3 pages.

*Primary Examiner* — Sizo Vilakazi
(74) *Attorney, Agent, or Firm* — Julia Voutyras; McCoy Russell LLP (57) ABSTRACT A method and apparatus for controlling the operation of an engine of a motor vehicle is disclosed in which the engine is restarted while the vehicle is in motion by bump starting it if the speed of the vehicle falls within predetermined speed limits but is otherwise restarted using a starter motor. The number of starts for which the starter motor is used is thereby reduced advantageously reducing wear of the starter motor and increasing the life and/or reducing the duty cycle of the battery or source of power used for the starter motor.

20 Claims, 6 Drawing Sheets (51) Int. Cl.
*B60W 10/06* (2006.01)
*F02N 5/04* (2006.01)
*F02N 11/08* (2006.01)

(52) U.S. Cl.
CPC ............ *F02N 5/04* (2013.01); *F02N 11/0833* (2013.01); *B60W 2030/1809* (2013.01); *B60W 2510/1005* (2013.01); *B60W 2520/10* (2013.01); *B60Y 2300/49* (2013.01); *F02N 2200/0801* (2013.01); *F02N 2300/2002* (2013.01); *Y02T 10/48* (2013.01)

(58) Field of Classification Search
USPC .................. 123/179.1, 179.22, 179.3, 179.4; 701/113; 477/70, 77, 99, 166, 173, 181
See application file for complete search history.

(56) References Cited

U.S. PATENT DOCUMENTS

| | | | |
|---|---|---|---|
| 7,117,965 B2 | 10/2006 | Yatabe | |
| 2003/0006076 A1* | 1/2003 | Tamor | B60W 10/06 180/65.25 |
| 2005/0187068 A1* | 8/2005 | Kim | F16D 48/064 477/70 |
| 2007/0026993 A1* | 2/2007 | Kawamoto | F16D 48/06 477/70 |
| 2009/0241883 A1* | 10/2009 | Nagoshi | F02N 11/0825 123/179.4 |
| 2010/0076653 A1* | 3/2010 | Ronge | B60W 30/18027 701/58 |
| 2011/0053735 A1* | 3/2011 | Lewis | F02N 11/0822 477/99 |
| 2011/0054765 A1* | 3/2011 | Lewis | F02D 41/062 701/112 |

FOREIGN PATENT DOCUMENTS

| | | |
|---|---|---|
| JP | 2005127332 A | 5/2005 |
| JP | 2006183547 A | 7/2006 |
| JP | 2007187090 A | 7/2007 |
| JP | 2009035188 A | 2/2009 |
| KR | 20100017014 A1 | 2/2010 |
| WO | 2005068827 A1 | 7/2005 |

* cited by examiner

METHOD AND APPARATUS FOR CONTROLLING AN ENGINE OF A MOTOR VEHICLE

RELATED APPLICATIONS

The present application claims priority to United Kingdom Patent Application No. 1106336.9, filed on Apr. 14, 2011, the entire contents of which are hereby incorporated by reference for all purposes.

FIELD

This disclosure relates to the control of an internal combustion engine and in particular to the restarting of such an engine while a vehicle to which the engine is fitted is in motion.

BACKGROUND AND SUMMARY

It is known to stop an engine of a motor vehicle while the vehicle is in motion in order to reduce emissions and fuel consumption. Such engine stops are performed automatically in the case of hybrid motor vehicles and free rolling stop-start vehicles when one or more predetermined conditions exist. A free rolling stop-start motor vehicle is one in which the engine is stopped while the vehicle is in motion unlike a conventional stop-start motor vehicle in which the engine is only stopped when the motor vehicle is determined to be stationary. A hybrid motor vehicle is one in which the motor vehicle has at least two sources of motive power, namely an internal combustion engine (hereinafter engine) and one or more electric traction motors.

In both cases it is desirable in certain circumstances to stop the internal combustion engine in order to save fuel and reduce emissions.

One of the features of such free rolling engine stop-start and hybrid systems is that the engine is stopped and started more often than is the case with a conventional motor vehicle or a conventional stop-start vehicle due to the increased opportunities to stop the engine. Although this increased opportunity has significant fuel saving and emission reduction benefits it produces a much increased burden on the battery or electrical energy storage device. This is because every time the engine is restarted a starter motor has to be engaged to restart the engine causing a drain on the battery or electrical energy storage device used to power it and potentially utilizing a larger battery or electrical energy storage device than is ideal.

It has been proposed in U.S. Pat. No. 6,524,217 to use the inertia of the motor vehicle to restart the engine in certain circumstances by a method known as a bump start in which a clutch is engaged causing the motion of the motor vehicle to be transmitted back through the drive-line to the engine, thereby causing it to rotate at a sufficiently high enough speed to permit starting to occur.

It is a problem with a system as disclosed in U.S. Pat. No. 6,524,217 that because the vehicle speed only has to be that at which sufficient inertia is available to start the engine, jerking of the motor vehicle may occur which is unacceptable to many vehicle owners. It is a further disadvantage that over-revving of the engine could occur if the vehicle speed is higher than expected when the restart occurs.

The inventors herein have recognized the issues with the above approach and provide a method to at least partly address them. In one embodiment, a method of controlling an internal combustion engine of a motor vehicle comprises, in response to a request for a start-up of the engine, determining whether the motor vehicle is currently travelling at a vehicle speed within a predetermined range of speed and, if the motor vehicle is travelling within the predetermined range of speed, using the inertia of the motor vehicle to bump start the engine.

This has the advantage that the number of times the starter motor has to be used can be reduced, thereby reducing the additional wear on the starter motor compared to a conventional stop-start device. Further, by restricting the use of the bump start to predetermined vehicle speeds, over-revving of the engine, jerky starts, and/or undesired torque fluctuations may be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A to 5 are various embodiments of the method according to the said further aspect of the disclosure.

DETAILED DESCRIPTION

Vehicles may operate with automatic start-stop mechanisms in which the engine is automatically shut down during certain operating conditions in order to conserve fuel and reduce emissions. In response to a request (e.g., actions indicating an operator of the vehicles desires the vehicle to move), the engine may be restarted. The automatic start-stop may be performed while the vehicle is still in motion. However, these frequent restarts may cause undue strain on the starter motor. Under some conditions, such as when the engine is operating within a predetermined speed range and/or with a certain transmission gear, the motion of the vehicle may be transmitted to the engine in order to restart the engine, rather than utilizing the starter motor.

The predetermined range of speed may be defined by an upper vehicle speed limit and a lower vehicle speed limit. The motor vehicle may have a multi-speed transmission having a plurality of transmission ratios and a means to sense whether neutral has been selected and the method may further comprise basing upper and lower vehicle speed limits on the use of an upper speed limit for a first transmission ratio of the multi-speed transmission and a lower speed limit of the highest transmission ratio of the multi-speed transmission to bump start the engine.

The motor vehicle may have a multi-speed transmission having a plurality of transmission ratios and means to determine which transmission ratio is currently selected and the method may further comprise determining which transmission ratio is currently selected and using upper and lower vehicle speed limits based upon the currently selected transmission ratio.

The upper vehicle speed limit may be a vehicle speed that will not cause over-speeding of the engine when the engine is driven with no slip by the multi-speed transmission of the motor vehicle with the motor vehicle travelling at that speed.

The lower vehicle speed may be a vehicle speed that will not cause unacceptable torque fluctuations when the engine starts while being driven with no slip by the multi-speed transmission of the motor vehicle with the motor vehicle travelling at that vehicle speed.

The request to start-up the engine may be based upon one or more actions of the driver.

The request to start the engine may be a request based upon one or more operating parameters of the motor vehicle.

According to an embodiment of the disclosure there is provided a motor vehicle control apparatus for an engine driving a multi-speed transmission wherein the apparatus comprises an electronic control unit, at least one input indicative of vehicle speed and at least one input indicative of a desired running state of the engine wherein in response to a request from said running state input for a start-up of the engine, the electronic control unit determines from the vehicle speed input the current vehicle speed of the motor vehicle, determines whether the motor vehicle is currently travelling at a vehicle speed within a predetermined range of speed and, if the motor vehicle is travelling within the predetermined range of speed, uses the inertia of the motor vehicle to bump start the engine.

The apparatus may use the inertia of the motor vehicle to start the engine by using the multi-speed transmission to drive the engine. The multi-speed transmission may drive the engine through a clutch and the clutch may be engaged to cause the multi-speed transmission to drive the engine.

The motor vehicle may further comprise a starter motor and the electronic control unit may use the starter motor to start the engine if the current vehicle speed of the motor vehicle is outside the predetermined range of speed.

The predetermined range of speed may be defined by an upper vehicle speed limit and a lower vehicle speed limit.

The electronic control unit may receive a signal indicative of whether neutral is engaged and may base the upper and lower vehicle speed limits on the use of an upper speed limit for a first transmission ratio of the multi-speed transmission and a lower speed limit of the highest transmission ratio of the multi-speed transmission to bump start the engine.

The electronic control unit may receive a signal indicative of the currently selected transmission ratio and the electronic control unit may determine the upper and lower vehicle speed limits based upon which transmission ratio is currently selected.

The upper vehicle speed limit may be a vehicle speed that will not cause over-revving of the engine when the engine is driven with no slip by the multi-speed transmission of the motor vehicle with the motor vehicle travelling at that speed.

The lower vehicle speed limit may be a vehicle speed that will not cause unacceptable torque fluctuations when the engine starts while being driven with no slip by the multi-speed transmission of the motor vehicle with the motor vehicle travelling at that speed.

The motor vehicle may further comprise an electronically controlled automatic transmission driven via a clutch by the engine, determining whether the motor vehicle is currently travelling at a vehicle speed within the predetermined range of speed may comprise comparing the current vehicle speed with predetermined speed ranges for each of the transmission ratios of the automatic transmission and, if the current vehicle speed falls within one or more of the predetermined speed ranges, automatically selecting one of the corresponding transmission ratios and using the inertia of the motor vehicle to bump start the engine and, if the current vehicle speed falls within none of the predetermined speed ranges for the transmission ratios of the automatic transmission, using the starter motor to start the engine.

According to an embodiment of the disclosure there is provided a motor vehicle having an apparatus constructed in accordance with said second aspect of the disclosure.

Figure 1:
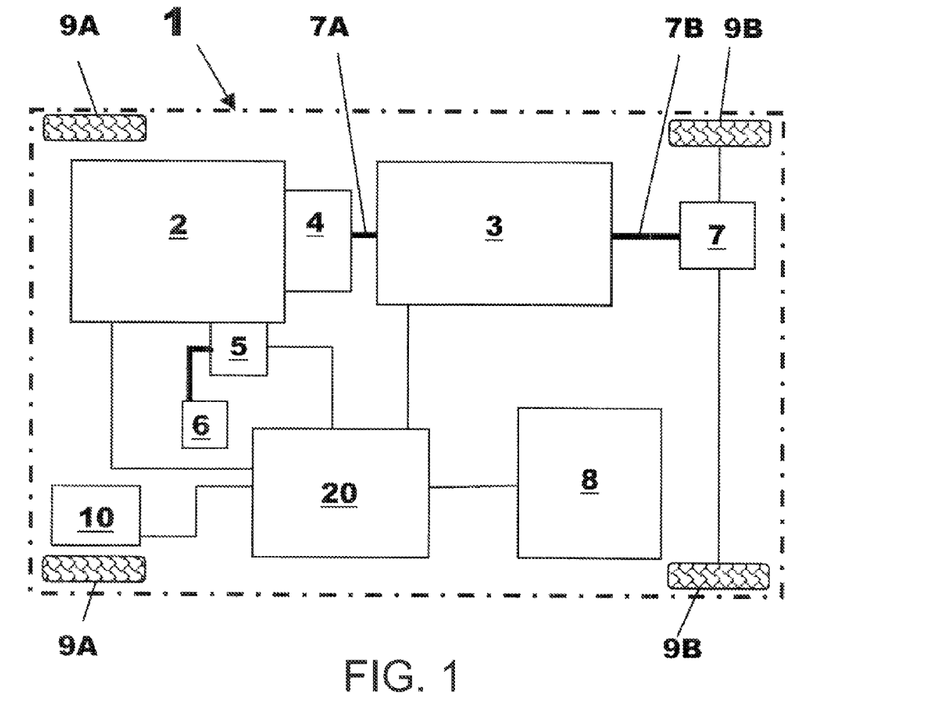
FIG. 1 is a block diagram of a motor vehicle having an engine control apparatus according to one aspect of the disclosure.

Referring now to FIG. 1 there is shown a motor vehicle which in this case is a free rolling stop-start motor vehicle 1. The motor vehicle 1 has two non-driven road wheels 9A and two driven road wheels 9B, an internal combustion engine 2 driving a multi-speed transmission 3 via a clutch 4, a starter motor 5 to selectively start the engine 2, a source of electrical energy in the form of a battery 6 to provide electrical energy for the starter motor 5 and an electronic control unit 20 forming part of an apparatus used to control the operation of the engine 2.

The engine 2 includes a fuel supply system (not shown), an air supply system (not shown) and in the case of a spark ignited engine an ignition system (not shown) each of which is controlled by the electronic control unit 20. It will be appreciated that the electronic control unit 20 may in practice comprise of several separate electronic control units that communicate with one another in order to perform the control functions described herein.

The multi-speed transmission 3 has an input 7A connected to the engine 2 via the clutch 4 and an output 7B which provides drive to a final drive unit 7 of the motor vehicle 1. The multispeed transmission 3 has in this case five different forward drive transmission ratios, ranging from a lowest transmission ratio referred to as first gear and a highest transmission ratio referred to as fifth gear with second, third, and fourth transmission ratios disposed therebetween. It will be appreciated that the multi-speed transmission 3 can be of a suitable type. For example, it may be of a conventional gearwheel type known as a gearbox in which distinct gears engage with one another to produce the transmission ratios. In another example, it may be of the stepped continuously variable transmission type often referred to as a simulated manual gearbox (SMG) in which the continuously variable transmission is controlled to only provide a number of predetermined transmission ratios. In the case of a gearbox, the input 7A to the gearbox may be provided by a single clutch 4, or there may be two clutches in what is known as a dual clutch gearbox in which odd gears are driven by one clutch and even gears are driven by the other clutch.

In either case, the clutch may be a manual clutch operated directly by a driver of the motor vehicle 1, or an E-clutch in which the actual engagement and disengagement of the clutch is electronically controlled and movement of the clutch pedal by the driver is used as an indication of a desired state of the clutch.

In this example the multi-speed transmission 3 is a manual transmission controlled by a driver moving a gear lever (not shown), but it will be appreciated that the multi-speed transmission could alternatively be an automatic transmission.

In first gear the ratio between the input 7A to the transmission 3 and the output 7B is 3.5 to 1 and in fifth gear the ratio between the input 7A to the transmission 3 and the output 7B is 1.0 to 1. The drive ratio of the final drive unit 7 is fixed at 4.4 to 1 and the rolling radius of each of the road wheels is 0.25 m. It is therefore possible to calculate for each of the transmission ratios in the multi-speed transmission 3 the equivalent rotational speed of the engine 2 for any forward vehicle speed of the motor vehicle 1 provided that the clutch 4 is fully engaged and that there is no slip between the engine 2 and the input 7A to the multi-speed transmission 3.

The motor vehicle 1 further comprises one or more vehicle speed sensors 10 that provide information to the electronic control unit 20 from which the current vehicle speed of the motor vehicle 1 can be deduced. In the example shown, the vehicle speed sensor is a road wheel rotational speed sensor in the form of a sensor 10 associated with an anti-lock braking system (not shown) sensing the rotational speed of an adjacent non-driven road wheel 9A. However, it will be appreciated that other sensors could be used, such as, for example, a sensor measuring the rotational speed of the output 7B from the multi-speed transmission 3. The electronic control unit 20 also receives one or more inputs shown collectively by the reference numeral 8 on FIG. 1 from which one or more actions of a driver of the motor vehicle 1 can be deduced. For example and without limitation, these inputs 8 may comprise one or more of clutch pedal position, clutch engagement state, accelerator pedal position, brake pedal position, gear lever selector position, transmission neutral state and current engaged transmission ratio. The inputs 8 are provided by sensors associated with driver responsive devices, such as for example and without limitation, a clutch pedal, an accelerator pedal, a gear lever, a brake pedal, and transmission ratio selector means, none of which are shown on FIG. 1.

Operation of the control apparatus is as follows for a motor vehicle having a manual transmission for which no knowledge of the transmission ratio currently selected is available but for which it is known whether or not the transmission is in neutral.

When an engine start is required whilst the motor vehicle 1 is in motion, rather than use the starter motor 5 the apparatus, namely the electronic control unit 20 and its associated inputs and outputs, is operable to rotate the engine 2 using the inertia of the motor vehicle 1 via the driven road wheels 9B and the driveline which includes the final drive unit 7, the multi-speed transmission 3 and the clutch 4 in what is known as a 'bump start'. To ensure a smooth engine restart the engine control unit 20 will only allow a non-starter device start or 'bump start' when the vehicle speed is within a predetermined vehicle speed range.

The predetermined speed range is bounded by an upper vehicle speed limit and a lower vehicle speed limit. The upper vehicle speed limit is chosen such that the rotational speed of the engine 2 will not exceed, at the moment the engine 2 starts, a maximum permissible rotational speed of the engine 2 which is lower than an overspeed limit for the engine 2. The upper vehicle speed limit is therefore chosen to prevent overspeeding of the engine 2 and is also based upon driveability of the motor vehicle 1. That is to say, although the engine may have a speed limit or Rev-limit of say 7000 RPM, above which it is said to be over-speeding or over-revving, the upper vehicle speed limit may be considerably lower than this, for example 3500 RPM. This is a drivability defined limit due to the fact that a speed above this rotational speed may produce a negative reaction from the average driver of the motor vehicle 1.

The lower vehicle speed limit is chosen such that the vehicle speed will produce a rotational speed of the engine 2, at the point where starting of the engine 2 occurs, that is sufficiently high for the engine to start without producing significant torque variations (under-revving). That is to say, the engine speed is chosen based upon driveability in that the chosen speed is a speed where the engine 2 produces sufficient torque to start smoothly and absorb the load imparted by the vehicle 1 via the driveline. This speed may be a speed below the normal idle speed but is in all cases above the lowest speed where the engine 2 could theoretically be started by the kinetic energy of the motor vehicle 1. This is because, if the engine 1 is started at the very low rotational speed that would result from the use of the minimum kinetic energy speed, insufficient torque is produced by the engine 2 and this results in a jerky start-up.

In the case where the transmission ratio currently selected is not known but whether the multi-speed transmission is or is not in gear is known, the fastest speed that a bump start can be performed, known as the upper vehicle speed limit, and the lowest vehicle speed that a bump start can be performed without producing a jerky start due to torque fluctuations, known as the lower vehicle speed limit, are based upon the upper limit for the first gear transmission ratio (U_L1) and the lower limit for the fifth gear ratio (L_L5) respectively. This is because between these speeds the engine 2 can be restarted using kinetic energy without over-revving or under-revving the engine 2.

In the case where the transmission ratio currently selected is known, the upper and lower vehicle speed limits are determined for each of the forward transmission ratios and stored in a memory of the electronic control unit 20. The electronic control unit 20 then, in response to a request for an engine start from one or more driver input devices 8, checks which transmission ratio is currently selected in the multi-speed transmission 3, selects the appropriate vehicle speed range for that transmission ratio, and determines whether the current vehicle speed as measured by the vehicle speed sensor 10 is within the predetermined vehicle speed range. If the current measured vehicle speed is within the predetermined vehicle speed range then the kinetic energy of the motor vehicle is used to start the engine 2 and if the current measured speed is outside the predetermined vehicle speed range then the starter motor 5 is used to start the engine 2.

It will be appreciated that instead of a dedicated starter motor some other electrical device could be used to start the engine 2. For example the means to start the engine 2 could be a motor/generator which is used as a motor to start the engine 2 and as a generator to charge the battery 6. In the case of a hybrid motor vehicle having one or more traction electric motors, then one of the traction electric motors could be used to start the engine 2.

Figure 2:
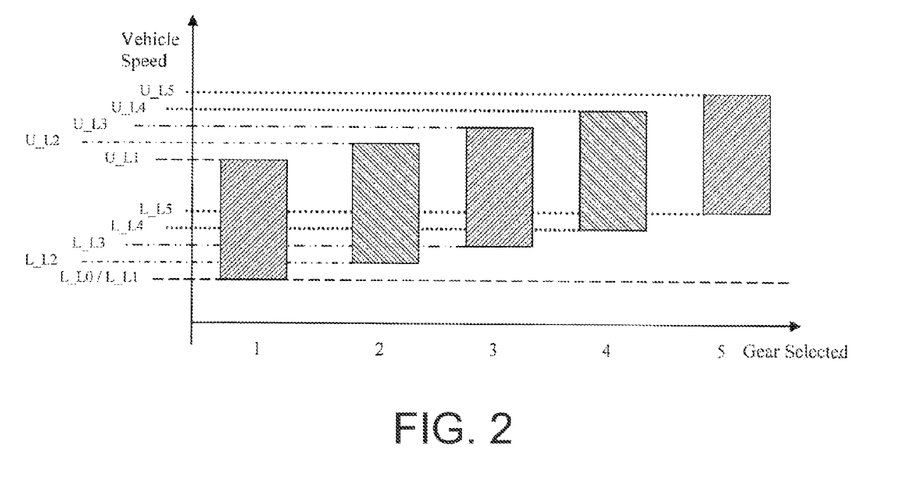
FIG. 2 is a chart showing various speed ranges used by the engine control apparatus and forming part of a method according to further aspect of the disclosure.

FIG. 2 shows in a diagrammatic form the various predetermined vehicle speed ranges for the five speed multi-speed transmission. For first gear the vehicle speed range is defined by the lower and upper vehicle speed limits L_L1 and U_L1 respectively. The speed L_L1 in this case corresponds to the lowest permitted vehicle speed L_L0 because first gear is the lowest transmission ratio and the determination of the lowest permissible vehicle speed is based upon the use of first gear.

For second gear the vehicle speed or speed range is defined by the lower and upper vehicle speed limits L_L2 and U_L2 respectively. For third gear the vehicle speed or speed range is defined by the lower and upper vehicle speed limits L_L3 and U_L3 respectively. For fourth gear the vehicle speed or speed range is defined by the lower and upper vehicle speed limits L_L4 and U_L4 respectively. For fifth gear the vehicle speed or speed range is defined by the lower and upper vehicle speed limits L_L5 and U_L5 respectively.

Therefore in the case of a multi-speed transmission where the engaged gear is known the electronic control unit 20 is programmed to perform the following logical control operations:

If TR=1 (Is L_L1<VS<U_L1) If 'Yes' Bump start Engine and if 'No' use starter motor.

If TR=2 (Is L_L2<VS<U_L2) If 'Yes' Bump start Engine and if 'No' use starter motor.

If TR=3 (Is L_L3<VS<U_L3) If 'Yes' Bump start Engine and if 'No' use starter motor.

If TR=4 (Is L_L4<VS<U_L4) If 'Yes' Bump start Engine and if 'No' use starter motor.

If TR=5 (Is L_L5<VS<U_L5) If 'Yes' Bump start Engine and if 'No' use starter motor.

Where TR is the current transmission ratio, L_LX is the lower speed limit for the transmission ratio X, U_LX is the upper speed limit for the transmission ratio X, and X varies in this case from 1 to 5 and VS is the current vehicle speed.

Figure 3A:
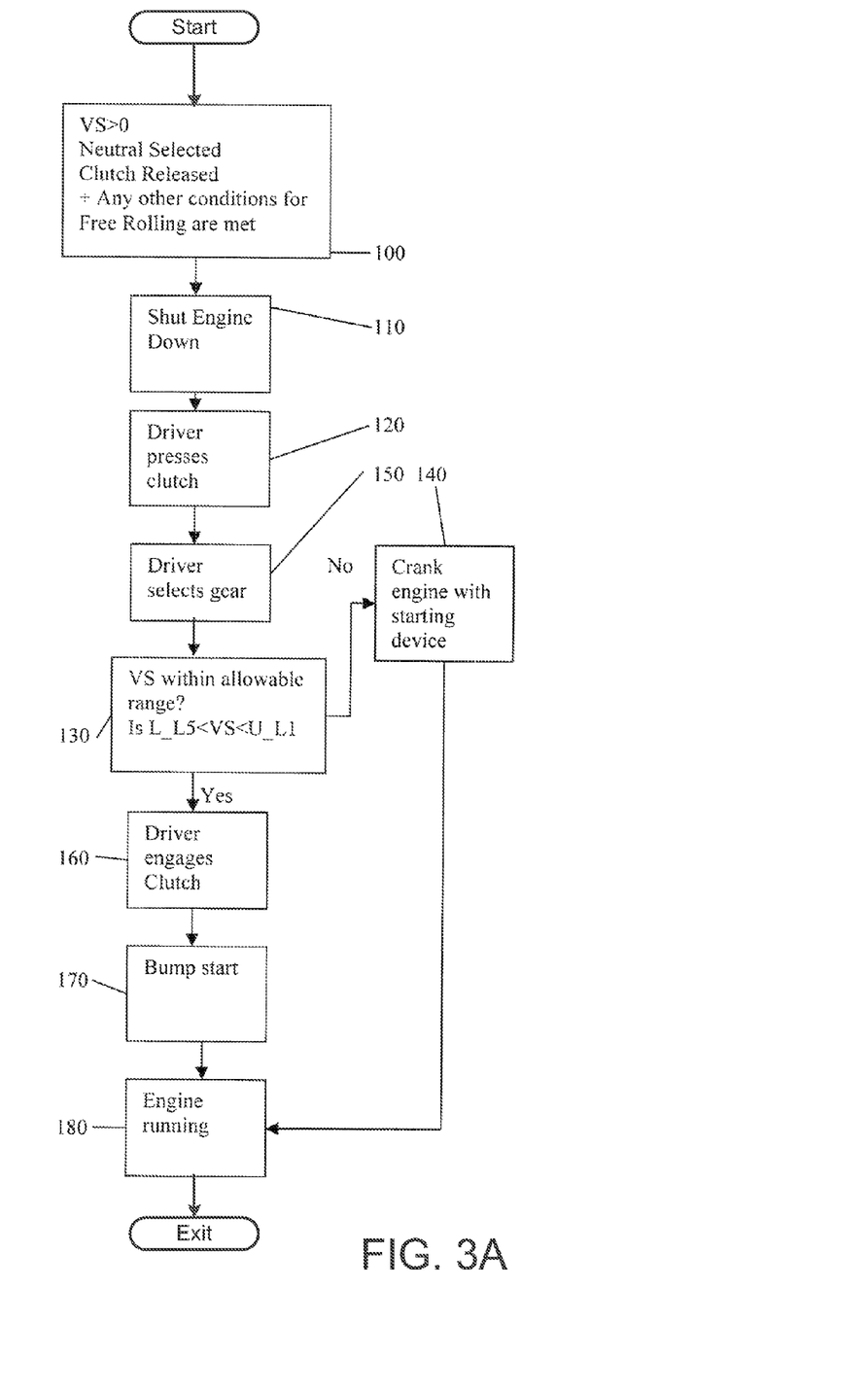
Figure 3B:
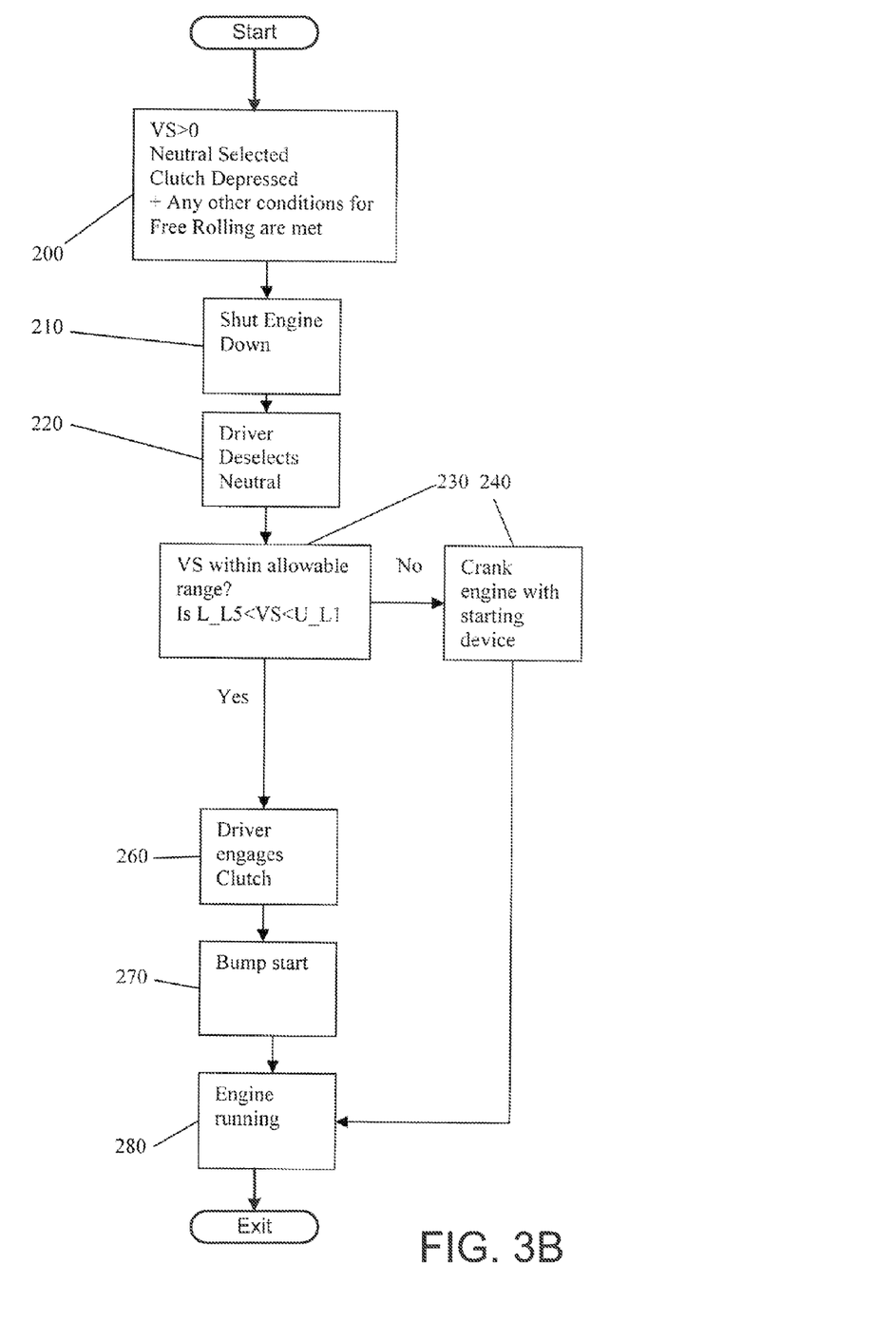

Referring now to FIGS. 3A and 3B there are shown two embodiments of a method according to the disclosure as applied to a manual transmission in which the currently selected transmission ratio is not known, but whether or not the transmission is in neutral is known, the primary difference between these two methods is the driver inputs used to stop and start the engine 2.

Referring firstly to FIG. 3A the method starts at box 100 which is the conditions for the stopping of the engine while the motor vehicle is moving, in what is termed a Free Rolling Engine Stop (FRES). In this case the conditions for the FRES are that the vehicle speed is above zero that is to say, VS>0; a neutral transmission ratio has been selected in the multi-speed transmission 3 as indicated by an input from the driver inputs 8; a clutch pedal has been released as indicated by an input from the driver inputs 8 so that the clutch 4 is fully engaged and any other conditions required for a FRES such as, for example, the temperature of the engine 2 is above a predetermined temperature.

When these FRES conditions are met, the engine 2 is stopped or shut-down as indicated in box 110. The shut-down can be effected in several different manners depending upon the type of engine and its specific construction but in general terms this shut-down will include the switching off of a fuel supply to the engine 2. In the case of a spark ignited engine the ignition system may also be switched off.

The engine 2 will remain in this shut-down state until a driver indicated restart is requested by, in this case, the action of the driver pressing the clutch pedal so as to disengage the clutch 4 as indicated in box 120 and by the de-selection of neutral that is to say, the selection of a transmission drive ratio or gear as indicated in box 150. Selecting a transmission drive ratio (often referred to as selecting a gear or deselecting neutral) is detected by a transmission state that is not in neutral.

The electronic control unit 20 then checks whether the current vehicle speed (VS) is within a predetermined range which in this case is based upon the use of first gear for the re-start. This is performed in box 130 using the test Is L_L5<VS<U_L1? If the answer to this test is 'No' then the method advances to box 140 and the engine is cranked using the starter motor 5 resulting in the engine running as indicated in box 180. Alternatively, if the answer to the test in box 130 is 'Yes' then the method advances to the box 160 where the driver releases the clutch pedal so as to engage the clutch 4 thereby causing a bump start of the engine 2 to occur as indicated in box 170 and resulting in a restart of the engine 2 as indicated in box 180.

Referring now to FIG. 3B the method starts at box 200 which is the condition for the stopping of the engine while the motor vehicle is moving (FRES). In this case the conditions for the FRES are that the vehicle speed is above zero that is to say, VS>0; a neutral transmission ratio has been selected in the multi-speed transmission 3 as indicated by an input from the driver inputs 8; a clutch pedal is depressed as indicated by an input from the driver inputs 8 so that the clutch 4 is disengaged and any other conditions required for a FRES are met.

When the FRES conditions are met in box 200 the engine 2 is stopped or shut-down as indicated in box 210. The shut-down can be effected in several different manners depending upon the type of engine as previously discussed.

The engine 2 remains in the shut-down state until a driver indicated restart is requested by, in this case, the action of the driver deselecting neutral as indicated in box 220.

The electronic control unit 20 then checks whether the current vehicle speed (VS) is within a predetermined range which in this case is based upon the use of first gear for the re-start. This is performed in box 230 using the test Is L_L5<VS<U_L1? If the answer to this test is 'No' then the method advances to box 240 and the engine 2 is cranked using the starter motor 5 resulting in the engine 2 running as indicated in box 280. Alternatively, if the answer to the test in box 230 is 'Yes' then the method advances to the box 260 where the driver releases the clutch pedal so as to engage the clutch 4 thereby causing a bump start of the engine 2 to occur as indicated in box 270. This bump start results in a restart of the engine 2 as indicated in box 280. It will be appreciated that if the driver does not engage the clutch 4 as indicated in box 260 the bump start in box 270 will not occur.

Figure 4A:
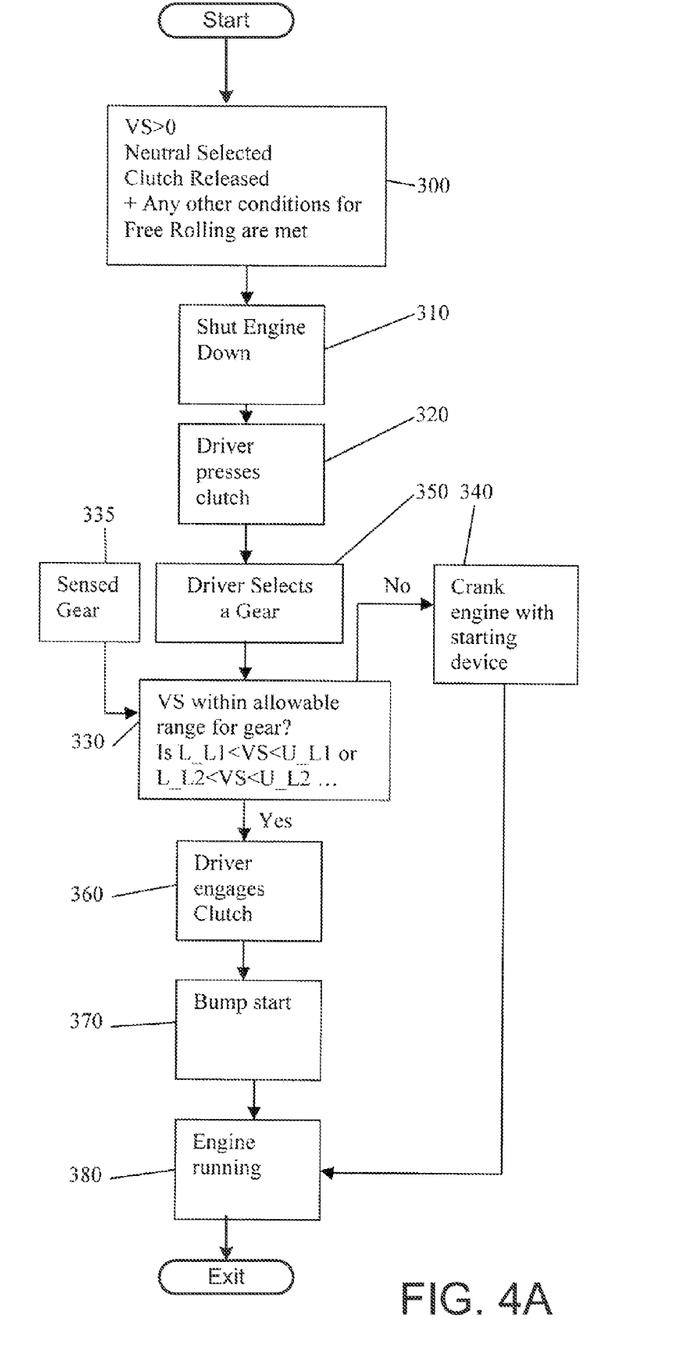
Figure 4B:
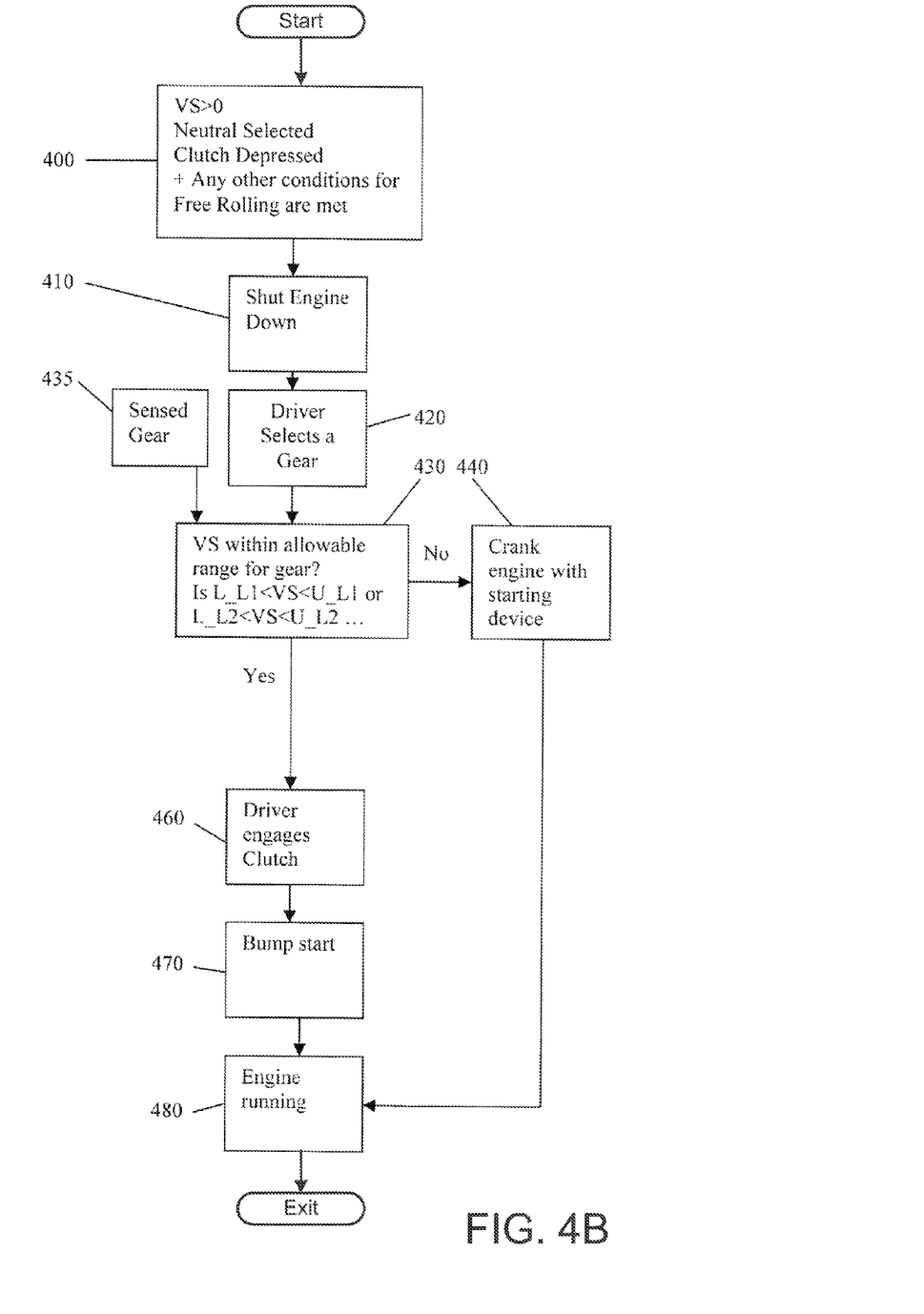

Referring now to FIGS. 4A and 4B there are shown two embodiments of a method according to the disclosure as applied to a manual or SMG transmission in which the currently selected transmission ratio is known, the primary difference between these two methods is the driver inputs used to stop and start the engine 2.

Referring firstly to FIG. 4A the method starts at box 300 which is the conditions for the stopping of the engine while the motor vehicle is moving (FRES). In this case the conditions for the FRES are that the vehicle speed is above zero that is to say, VS>0; a neutral transmission ratio has been selected in the multi-speed transmission 3 as indicated by an input from the driver inputs 8; a clutch pedal has been released as indicated by an input from the driver inputs 8 so that the clutch 4 is fully engaged and any other conditions for a FRES are met.

When the FRES conditions are met in box 300, the engine 2 is stopped or shut-down as indicated in box 310. The engine 2 remains in this shut-down state until a driver indicated restart is requested by, in this case, the action of the driver pressing the clutch pedal so as to disengage the clutch 4 as indicated in box 320 and the selection of a transmission ratio (gear selection) as indicated in box 350.

The electronic control unit 20 then determines the currently selected transmission ratio (gear ratio) as indicated by box 335 and checks in box 330 whether the current vehicle speed (VS) is within a predetermined vehicle speed range, which in this case is based upon the currently selected transmission ratio. The check performed in box 330 uses one of the tests:

If first gear is selected (Is L_L1<VS<U_L1)
If second gear is selected (Is L_L2<VS<U_L2)
If third gear is selected (Is L_L3<VS<U_L3)
If fourth gear is selected (Is L_L4<VS<U_L4)
If fifth gear is selected (Is L_L5<VS<U_L5)

Where L_LX is the lower vehicle speed limit for the transmission ratio X, U_LX is the upper vehicle speed limit for the transmission ratio X, and X is the numeric value of the selected gear ratio. E.g., for first gear L_LX=L_L1 and U_LX=U_L1.

If the answer to the respective test is 'No' then the method advances to box 340 and the engine is cranked using the starter motor 5 resulting in the engine running as indicated in box 380. Alternatively, if the answer to the respective test in box 330 is 'Yes' then the method advances to the box 360 where the driver releases the clutch pedal so as to engage the clutch 4, thereby causing a bump start of the engine 2 to occur as indicated in box 370 and resulting in a restart of the engine 2 as indicated in box 380.

Referring now to FIG. 4B the method starts at box 400 which is the conditions for the stopping of the engine 2 while the motor vehicle 1 is moving (FRES). In this case the conditions for the FRES are that the vehicle speed is above zero that is to say, VS>0; a neutral transmission ratio has been selected in the multi-speed transmission 3 as indicated by an input from the driver inputs 8; a clutch pedal is depressed as indicated by an input from the driver inputs 8 so that the clutch 4 is disengaged and any other conditions for a FRES are met.

When the FRES conditions are met the engine 2 is stopped or shut-down as indicated in box 410. The engine 2 remains in the shut-down state until a driver indicated restart is requested by in this case the action of the driver selecting a gear as indicated in box 420.

The transmission ratio or gear ratio selected is provided to the electronic control unit 20 as indicated in box 435. The electronic control unit 20 then checks whether the current vehicle speed (VS) is within a predetermined range which in this case is based upon the actual selected transmission ratio. This check is performed in box 430 using one of the tests:

If first gear is selected (Is L_L1<VS<U_L1)
If second gear is selected (Is L_L2<VS<U_L2)
If third gear is selected (Is L_L3<VS<U_L3)
If fourth gear is selected (Is L_L4<VS<U_L4)
If fifth gear is selected (Is L_L5<VS<U_L5)

Where L_LX is the lower vehicle speed limit for the transmission ratio X, U_LX is the upper vehicle speed limit for the transmission ratio X, and X is the numeric value of the selected gear ratio.

If the answer to the respective test is 'No' then the method advances to box 440 and the engine 2 is cranked using the starter motor 5 resulting in the engine 2 running as indicated in box 480.

Alternatively, if the answer to the respective test in box 430 is 'Yes' then the method advances to the box 460 where the driver releases the clutch pedal so as to engage the clutch 4 thereby causing a bump start of the engine 2 to occur as indicated in box 470 and resulting in a restart of the engine 2 as indicated in box 480. It will be appreciated that if the driver does not engage the clutch 4 as indicated in box 460 the bump start in box 470 will not occur.

Figure 5:
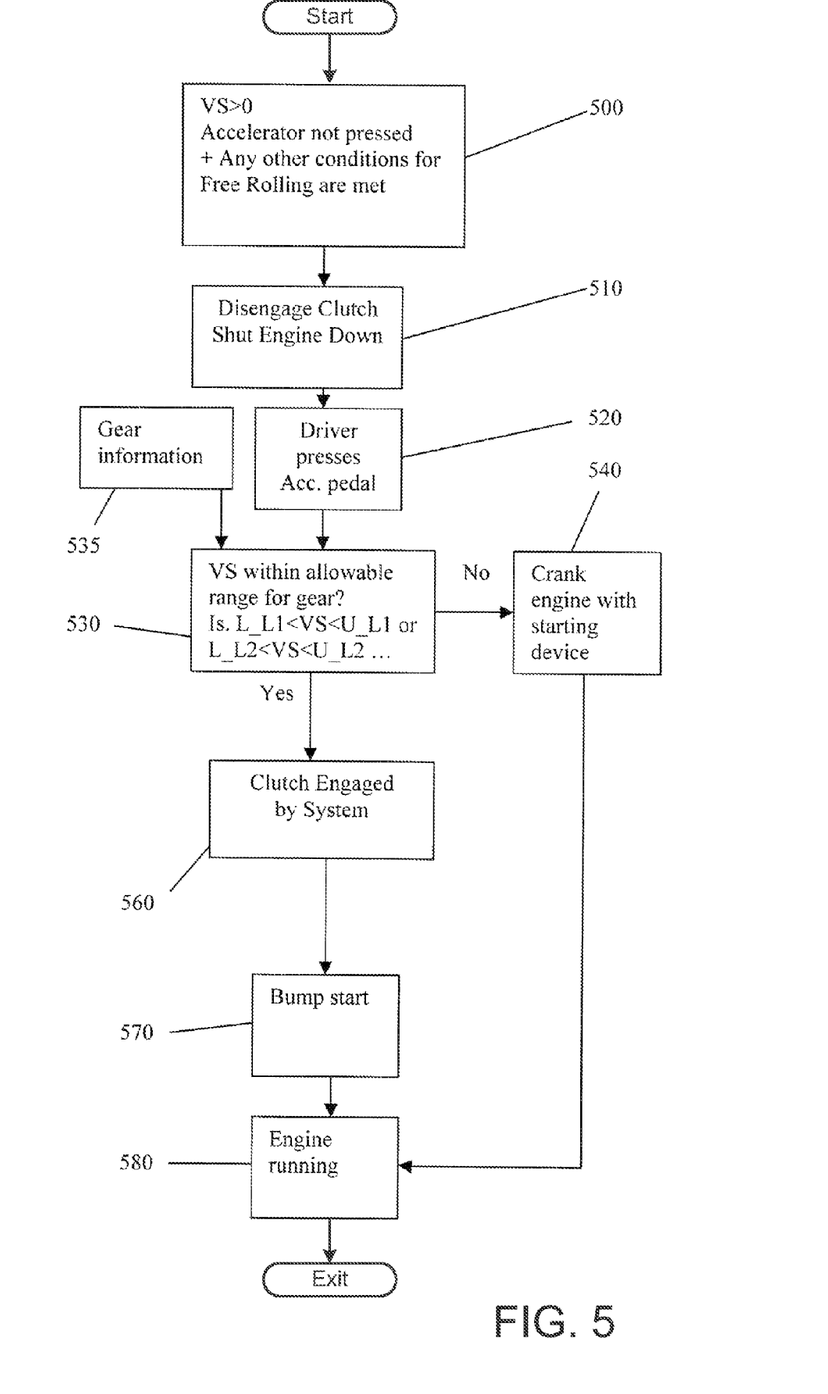

Referring now to FIG. 5 there is shown a method according to the disclosure as applied to an automatic transmission that is driven via a clutch by the engine 2. It will be appreciated that the transmission could also be of the twin or dual clutch type often known as a powershift transmission.

The method starts at box 500 which is the conditions for the stopping of the engine 2 while the motor vehicle 1 is moving (FRES). In this case the conditions for the FRES are that the vehicle speed is above zero that is to say, VS>0 and an accelerator pedal is not depressed as indicated by an input from the driver inputs 8 and any other conditions for a FRES are met such as for example that the engine 2 is running at a normal operating temperature.

When the FRES conditions are met in box 500, the engine 2 is stopped or shut-down as indicated in box 510 and the clutch or clutches are automatically disengaged. The engine 2 remains in the shut-down state until a driver indicated restart is requested by, in this case, the action of the driver depressing the accelerator pedal as indicated in box 520.

The transmission ratio or gear ratio selected is provided to the electronic control unit 20 as indicated in box 535. It will be appreciated that the gear selected is determined automatically in the normal manner but could be based upon a driver input such as the position of a shift stick. The electronic control unit 20 then checks whether the current vehicle speed (VS) is within a predetermined range which in this case is based upon the actual selected transmission ratio. This is performed in box 530 using one of the tests:

If first gear is selected (Is L_L1<VS<U_L1)
If second gear is selected (Is L_L2<VS<U_L2)
If third gear is selected (Is L_L3<VS<U_L3)
If fourth gear is selected (Is L_L4<VS<U_L4)
If fifth gear is selected (Is L_L5<VS<U_L5)

Where L_LX is the lower vehicle speed limit for the transmission ratio X, U_LX is the upper vehicle speed limit for the transmission ratio X, and X is the numeric value of the selected gear ratio.

It will be appreciated that in the case of an electronically controlled automatic transmission it would alternatively be possible to determine the current speed of the motor vehicle 1 and then select an appropriate transmission ratio so that the current vehicle speed (VS) falls within one of the predetermined speed ranges provided the current vehicle speed is above L_L0 and below U_L5.

Returning to box 530, if the answer to the respective test is 'No' then the method advances to box 540 and the engine 2 is cranked using the starter motor 5 resulting in the engine 2 running as indicated in box 580.

Alternatively, if the answer to the respective test in box 530 is 'Yes' then the method advances to the box 560 where the clutch is automatically engaged by an electronic control unit and then advances to box 570 where a bump start of the engine 2 occurs resulting in a restart of the engine 2 as indicated in box 580. That is to say the clutch is electronically controlled in such a manner as to be engaged when a restart is indicated. In the case of a twin or dual clutch gearbox, the appropriate clutch would be engaged for the transmission ratio selected.

Although the disclosure has been described above with respect to various multi-speed transmission all having five forward transmission ratios, it will be appreciated that the disclosure is not limited to use with a 5 speed transmission and that the transmission could have more or less ratios.

Although the disclosure is particularly advantageous and has been described above in respect of its use for a motor vehicle having a stop-start system that permits a FRES it will be appreciated that the disclosure can be advantageously applied to a hybrid motor vehicle having multi-speed transmission and a separate source of motive power such as an electric traction motor. In such a case the engine 2 will be shut down and started automatically in response to factors that may include a driver input but could also be related to operational parameters of the motor vehicle 1. For example, the engine 2 may be shut down when the vehicle speed is below a particular speed, a state of charge of a battery used to power the traction motor is above a predetermined level, or when a state of charge of a battery used to power the traction motor is above a predetermined level and an accelerator pedal is not depressed or is depressed below a predetermined amount.

The engine 2 may be restarted in such cases when the vehicle speed is above a particular speed, a state of charge of a battery used to power the traction motor falls below a predetermined level, or when the accelerator pedal is depressed more than the predetermined amount.

It will be appreciated that there are numerous other combination of motor vehicle operating parameter that could be used to request stopping and starting of the engine 2 and that the disclosure is not limited to the examples given above and that these operating parameters could also be combined with driver inputs to form the start and/or stop requests.

The upper vehicle speed limit may be a vehicle speed that causes the engine to rotate at a speed between the speed at which maximum torque occurs and a speed at which maximum power occurs.

The lower vehicle speed limit may be a vehicle speed above the vehicle speed below which the inertia of the motor vehicle is just sufficient to start the engine such that sufficient torque is produced by the engine to enable a smooth acceleration of the motor vehicle.

Therefore in summary the disclosure provides a method and apparatus that uses a bump start to restart and engine of a motor vehicle only when a current speed of the motor vehicle falls within a predetermined speed range. In an embodiment of the disclosure the predetermined speed range is altered based upon the knowledge of a currently selected transmission ratio so as to provide an increased opportunity for bump starting the engine without producing over speeding of the engine or a jerky restart due to excessive torque fluctuations.

The methods described herein provide for a vehicle engine method comprising using kinetic energy of the vehicle to automatically restart the engine if vehicle speed is within a predetermined range that increases proportionately with gear ratio, and wherein an upper limit of the predetermined range is a vehicle speed resulting in an engine speed between maximum torque and maximum power, and using a starter motor to start the engine if vehicle speed is outside the predetermined range. In this way, the engine may be started using the kinetic energy of the vehicle (e.g., the movement of the vehicle) only when the vehicle speed is within a predetermined range, and otherwise starts the engine using the starter motor. The predetermined speed range may be a function of the transmission gear with which the vehicle is operating. As the gear increases, so does the speed range. In this way, when operating with a low gear, the vehicle may be started with the kinetic energy of the vehicle only when in a speed range that is lower than when the vehicle is operating in a higher gear. The upper limit of the speed range may be a vehicle speed that results in an engine speed that is between the maximum torque and maximum power allowed by the vehicle at that speed, thus avoiding transmission slip. The lower speed limit may be a vehicle speed below which torque fluctuations may occur and/or below which the kinetic energy of the vehicle may not be sufficient to start the engine.

While the embodiment described above increases the predetermined speed range as the transmission gear increases, in some embodiments the gear ratios may not change linearly with increasing gear, and as a result the predetermined speed range may not increase linearly with increasing gear.

It will be appreciated by those skilled in the art that although the disclosure has been described by way of example with reference to one or more embodiments it is not limited to the disclosed embodiments and that one or more modifications to the disclosed embodiments or alternative embodiments could be constructed without departing from the scope of the disclosure as defined by the appended claims.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an internal combustion engine of a motor vehicle comprising:
   via an electronic controller:
      receiving an input that a driver has selected a gear of a multi-speed transmission of the motor vehicle while the driver is pressing a clutch pedal of the motor vehicle to request for start-up of the engine, where the gear has a transmission ratio and the multi-speed transmission has a plurality of gears, each with a different forward drive transmission ratio;
      in response to receiving the input, determining whether the motor vehicle is currently travelling at a vehicle speed within a predetermined range of speed during the driver pressing the clutch pedal, the predetermined range of speed based on the transmission ratio of the selected gear and defined by an upper vehicle speed limit and a lower vehicle speed limit, the upper vehicle speed limit lower than an overspeed limit for the engine above which the engine is over-speeding at a moment the engine starts; and
      if the motor vehicle is travelling within the predetermined range of speed and in response to the driver releasing the clutch pedal, engaging a clutch of the motor vehicle to use inertia of the motor vehicle to bump start the engine.

2. The method as claimed in claim 1 further comprising starting the engine using a starter motor if the current vehicle speed of the motor vehicle is outside the predetermined range of speed.

3. The method as claimed in claim 1 wherein engaging the clutch to use inertia of the motor vehicle to bump start the engine includes engaging the clutch to rotate the engine using inertia of the motor vehicle via driven road wheels and a driveline of the motor vehicle, the driveline including the clutch and the multi-speed transmission.

4. The method as claimed in claim 3 wherein the multi-speed transmission has a plurality of transmission ratios and is configured to sense whether neutral has been selected, and further comprising basing the upper and lower vehicle speed limits on use of an upper speed limit for a first transmission ratio of the multi-speed transmission and a lower speed limit of a highest transmission ratio of the multi-speed transmission to bump start the engine.

5. The method as claimed in claim 3 wherein the multi-speed transmission has a plurality of transmission ratios and is configured to determine which transmission ratio is currently selected, and further comprising determining which transmission ratio is currently selected and using the upper and lower vehicle speed limits based upon the currently selected transmission ratio, and wherein the upper and lower vehicle speed limits change as the determined currently selected transmission ratio changes.

6. The method as claimed in claim 5 wherein the upper vehicle speed limit is a vehicle speed that will not cause over-speeding of the engine when the engine is driven with no slip by the multi-speed transmission of the motor vehicle with the motor vehicle travelling at that speed and wherein the lower vehicle speed limit is a vehicle speed that will not cause unacceptable torque fluctuations when the engine starts while being driven with no slip by the multi-speed transmission of the motor vehicle with the motor vehicle travelling at that vehicle speed.

7. The method as claimed in claim 3 further comprising prior to receiving the input, shutting down the engine in response to the driver pressing the clutch pedal and the driver selecting a neutral transmission ratio of the multi-speed transmission while the vehicle speed is greater than zero.

8. The method as claimed in claim 1 further comprising in response to the driver not engaging the clutch by releasing the clutch pedal when the motor vehicle is travelling within the predetermined range of speed, not bump starting the engine.

9. The method as claimed in claim 1 wherein the upper vehicle speed limit corresponds to an engine speed that is lower than the overspeed limit of the engine.

10. A motor vehicle control apparatus for an engine driving a multi-speed transmission, comprising:
an electronic control unit;
a clutch pedal operated by a driver of a motor vehicle;
at least one input indicative of vehicle speed; and
at least one input indicative of a desired running state of the engine,
wherein in response to a request from said running state input for a start-up of the engine, where the request is based on the driver selecting a gear of the multi-speed transmission having a forward drive transmission ratio while pressing the clutch pedal, the electronic control unit determines from the vehicle speed input a current vehicle speed of the motor vehicle, determines whether the motor vehicle is currently travelling at a vehicle speed within a predetermined range of speed, the predetermined range of speed based on the forward drive transmission ratio of the driver selected gear and defined by an upper vehicle speed limit and a lower vehicle speed limit, the upper vehicle speed limit lower than an overspeed limit for the engine above which the engine is over-speeding at a moment the engine starts, and, if the motor vehicle is travelling within the predetermined range of speed and the driver releases the clutch pedal, engages a clutch to rotate the engine using inertia of the motor vehicle via driven road wheels and a driveline of the motor vehicle to bump start the engine.

11. The apparatus as claimed in claim 10 wherein the driveline includes a final drive unit, the multi-speed transmission, and the clutch, wherein the multi-speed transmission drives the engine, and wherein the multi-speed transmission includes a plurality of different forward drive transmission ratios, where the gear selected by the driver corresponds to one of the plurality of different forward drive transmission ratios.

12. The apparatus as claimed in claim 11 wherein the multi-speed transmission drives the engine through the engaged clutch.

13. The apparatus as claimed in claim 10 wherein the motor vehicle further comprises a starter motor and the electronic control unit engages the starter motor to start the engine if the current vehicle speed of the motor vehicle is outside the predetermined range of speed.

14. The apparatus as claimed in claim 10 wherein the upper vehicle speed limit corresponds to an engine speed that is lower than the overspeed limit of the engine.

15. The apparatus as claimed in claim 14 wherein the electronic control unit receives a signal indicative of whether neutral is engaged and bases the upper and lower vehicle speed limits on an upper speed limit for a first transmission ratio of the multi-speed transmission and a lower speed limit of the highest transmission ratio of the multi-speed transmission to bump start the engine.

16. The apparatus as claimed in claim 14 wherein the electronic control unit receives a signal indicative of the currently selected transmission ratio and the electronic control unit determines the upper and lower vehicle speed limits based upon the currently selected transmission ratio, where the upper and lower vehicle speed limits are different for each transmission ratio of a plurality of forward drive transmission ratios of the multi-speed transmission.

17. The apparatus as claimed in claim 14 wherein the upper vehicle speed limit is a vehicle speed that will not cause over-revving of the engine when the engine is driven with no slip by the multi-speed transmission of the motor vehicle with the motor vehicle travelling at that speed and wherein the lower vehicle speed limit is a vehicle speed that will not cause unacceptable torque fluctuations when the engine starts while being driven with no slip by the multi-speed transmission of the motor vehicle with the motor vehicle travelling at that speed.

18. The apparatus as claimed in claim 14 wherein the electronic control unit, prior to receiving the request based on the driver selecting the gear of the multi-speed transmission having the forward drive transmission ratio while pressing the clutch pedal, shuts shown the engine in response to the driver pressing the clutch pedal and the driver selecting a neutral transmission ratio of the multi-speed transmission while the vehicle speed is greater than zero.

19. The apparatus as claimed in claim 10 wherein the motor vehicle further comprises an electronically controlled automatic transmission driven via the clutch by the engine, and wherein determining whether the motor vehicle is currently travelling at a vehicle speed within the predetermined range of speed comprises comparing the current vehicle speed with predetermined speed ranges for each transmission ratio of the automatic transmission and, if the current vehicle speed falls within one or more of the predetermined speed ranges, automatically selecting one of the corresponding transmission ratios and using the inertia of the motor vehicle to bump start the engine and, if the current vehicle speed falls within none of the predetermined speed ranges for the transmission ratios of the automatic transmission, engaging the starter motor to start the engine.

20. A method, comprising:
  via an electronic controller:
    receiving an input that a driver has selected a gear of a multi-speed transmission while the driver is pressing a clutch pedal, where the gear has a transmission ratio and the multi-speed transmission has a plurality of gears, each with a different forward drive transmission ratio; and
    in response to receiving the input:
      engaging a clutch to use kinetic energy of a vehicle to automatically restart an engine if vehicle speed is within a predetermined range that increases proportionately with the transmission ratio and in response to the driver releasing the clutch pedal, where the vehicle speed within the predetermined range is determined during the driver pressing the clutch pedal, wherein the predetermined range is defined by a lower limit and an upper limit, and wherein the upper limit of the predetermined range is a vehicle speed resulting in engine speed between maximum torque and maximum power, the upper limit lower than an overspeed limit for the engine above which the engine is over-speeding at a moment the engine starts; and
      engaging a starter motor to start the engine if vehicle speed is outside the predetermined range.

* * * * *